Patented Apr. 7, 1953

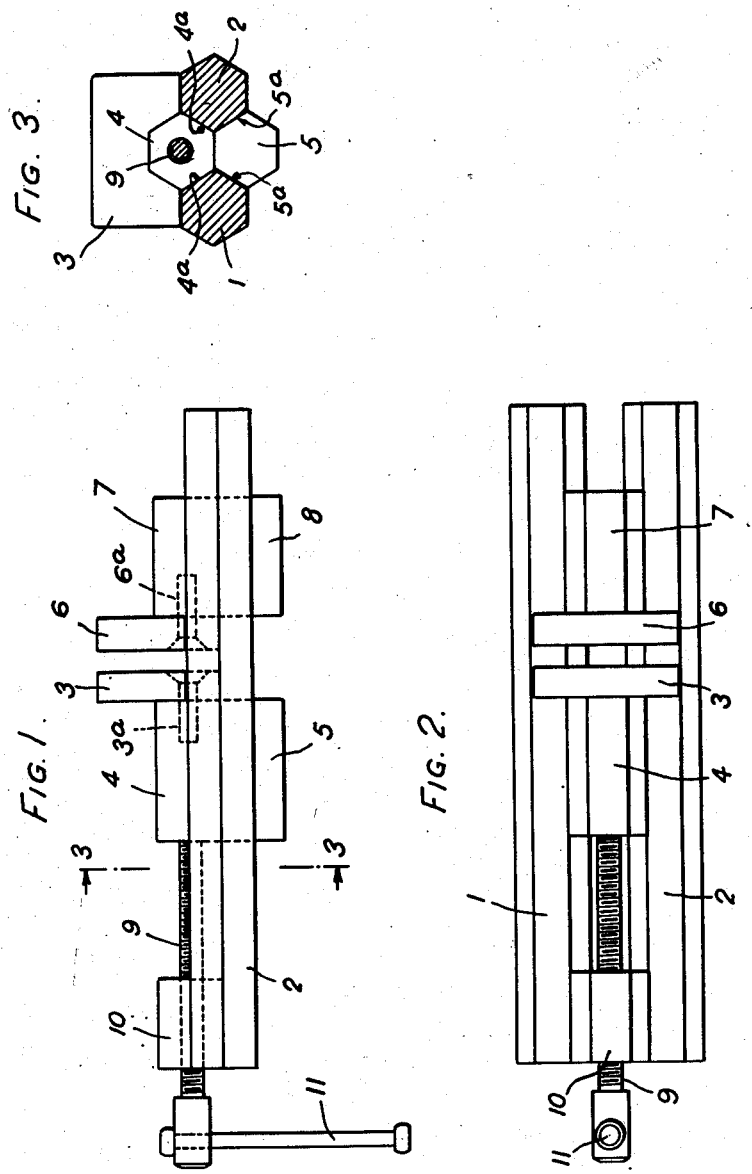

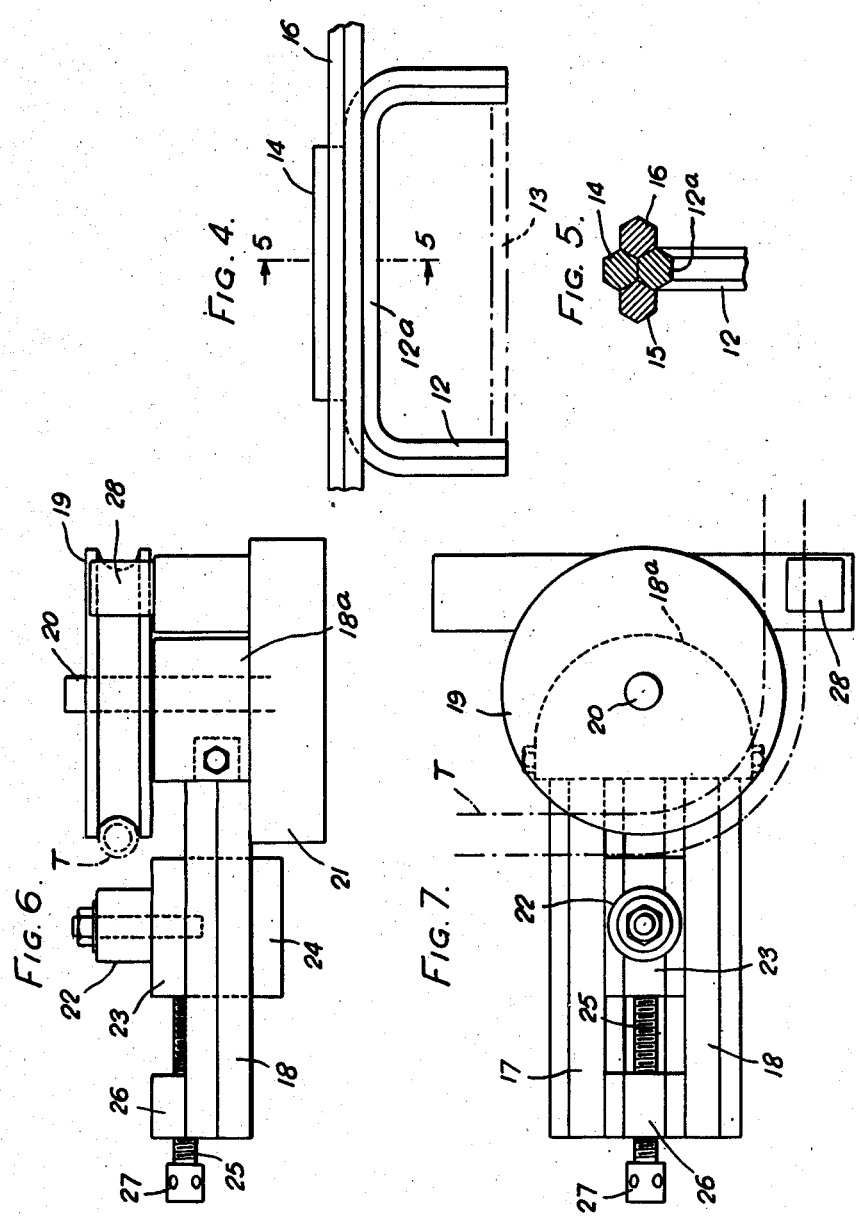

2,634,175

UNITED STATES PATENT OFFICE 2,634,175

MEANS FOR SLIDABLY SUPPORTING TOOLS OR MACHINE PARTS

William Horace Kennedy, Uxbridge, England

Application July 20, 1951, Serial No. 237,792
In Great Britain March 29, 1950

6 Claims. (Cl. 308—3)

This invention relates to means for slidably mounting a tool or machine part.

Heretofore it has been necessary to provide a slide bed having grooves or runways in which a member supporting a tool or machine part was adapted to slide. The machining of such runways is a relatively expensive operation which adds to the cost of the part.

It is an object of the present invention to provide means whereby a tool, machine part or the like can be slidably supported without the necessity of any machining operation.

According to the present invention a tool or machine part is mounted on a rod of hexagonal or like cross section which is supported by spaced parallel rods of the same cross section shape as the first mentioned rod, the arrangement being such that oppositely disposed flat sides of the first rod are slidably supported on adjacent flat sides of the parallel rods.

The invention may be used for mounting the adjustable jaw of a vice, reciprocably mounting a saw frame, mounting the movable abutment of a tube bending machine or for numerous other purposes.

To enable the invention to be fully understood it will now be described with reference to the accompanying drawings, in which:

Fig. 1 is a side elevation of a hand vice embodying the invention,

Fig. 2 is a plan of Fig. 1,

Fig. 3 is a section on the line 3—3 of Fig. 1,

Fig. 4 is a side elevation of a saw frame,

Fig. 5 is a sectional view on the line 5—5 of Fig. 4,

Fig. 6 is a side elevation of a tube bending machine embodying the invention, and Fig. 7 is a plan view of the machine shown in Fig. 6.

In the accompanying drawings, Figs. 1 to 3 illustrate a hand vice embodying the present invention. As shown, the vice comprises a pair of parallel spaced rods 1, 2 of hexagonal cross section which support the fixed and adjustable vice jaws, the rods being adapted to be secured to a bench or other support.

The vice includes an adjustable jaw 3 which is mounted on a short rod 4 of the same hexagonal cross section as the rods 1, 2, the opposite flat sides 4a making sliding contact with the adjacent flat sides of the rods 1, 2. The rod 4 is held in position by a further short hexagonal rod 5 which is secured by suitable means to the underside of the rod 4 and has flat sides 5a which make sliding engagement with the adjacent flat sides of the rods 1, 2. With this arrangement the vice jaw 3 is readily slidable along the rods 1, 2 and the necessity of machining slots or guideways in the rods 1, 2 for the jaw 3 to run in is obviated, and the cost of production accordingly greatly reduced.

The vice has a fixed jaw 6 which is mounted on a short hexagonal rod 7 secured to a similar short rod 8, the rods 7 and 8 being secured to the rods 1, 2 by screws or any other suitable means (not shown), the flat sides of the rods 7 and 8 resting on the adjacent flat sides of the rods 1, 2.

The adjustable jaw 3 is operated by a screw 9 which extends through a hexagonal nut 10 secured to the outer end of the rods 1, 2. The inner end of the screw 9 is rotatably mounted in the supporting rod 4 of the jaw 3 and its outer end is provided with suitable hand-operated means 11 for rotating the screw 9 to move the jaw 3 towards and away from the fixed jaw 6.

The nut 10 and fixed jaw rods 7 and 8 serve to hold the rods 1, 2 in correct parallel position, the distance between the latter rods being such that the supporting rods 4, 5 of the adjustable jaw 3 can slide freely over the flat sides of the rods 1, 2. The jaws 3 and 6 are secured to their respective rods by screws or bolts 3a, 6a.

The present invention provides a vice which can be easily made from the minimum number of parts without any special machining or like operations being necessary. It is particularly applicable for home construction as most of the parts are formed by lengths cut from a hexagonal rod.

A further application of the invention is illustrated in Figs. 4 and 5 wherein a reciprocating saw frame is formed of a rod 12 of hexagonal section bent to U-shape and adapted to have a saw blade, indicated by 13, secured to its free ends. A rod 14 of similar hexagonal cross-section is secured to the base 12a of the frame. The rod 14 is slidably supported on fixed parallel rods 15, 16 having the same hexagonal cross section, the opposite flat sides of the rod 14 and base 12a slidably engaging the adjacent flat sides of the rods 15, 16. The saw frame may be reciprocated over the rods 15, 16 by suitable power means, not shown.

In Figs. 6 and 7 the invention is shown as applied to the adjustable abutment of a tube bending machine. As shown the bending machine includes a pair of parallel rods 17, 18 of hexagonal cross-section secured by screws or bolts to a block 18a. A grooved former 19 is provided at one end mounted on a shaft 20 extending from a base 21 which is adapted to be secured to a bench or other support.

The adjustable abutment comprises a roller 22 mounted on a short rod 23 of similar hexagonal cross-section to the rods 17 and 18, the rod 23 having a further short hexagonal rod 24 secured to its underside whereby opposite flat sides of the rods 23, 24 slidably engage adjacent flat sides of the rods 17, 18 in the same manner as described in the vice described with reference to Figs. 1 to 3. An adjusting screw 25 is provided which extends through a hexagonal nut 26 secured to the outer end of the rods 17, 18 one end of the screw 25 being rotatably mounted in the rod 23 which supports the roller 22 and the opposite end having a manually operable member 27 whereby the screw 25 is rotated to move the roller 22 towards or away from the grooved former 19. In operating the bending machine, a tube indicated by T is positioned in the groove of the former 19 and one end is anchored by a stop 28. A grooved shoe or slipper (not shown) is inserted between the tube and the roller 22 which is adjusted by the screw 25 to clamp the shoe or slipper to the tube. The rods 17, 18 are then rotated as a unit in a horizontal plane relatively to the base 21 about the shaft 20 to bend the tube round the former 19. Figs. 6 and 7 show the parts in position after the tube has been bent.

In all three embodiments of the invention described the sliding parts of the apparatus are formed by rods of hexagonal cross-section. The invention is not, however, limited to sliding parts for the particular apparatus described and shown in the accompanying drawings as the invention may be used in any tool, machine or apparatus wherein a part is adapted to be mounted for sliding movement.

If desired the parallel spaced rods may be adapted to support a tool or machine part and be adapted to slide over a fixed rod which is positioned between them.

Further, although the rods forming the slide are described as being hexagonal in cross-section, they may be of any regular polygonal shape in cross-section.

I claim:

1. A slide for a tool or machine part comprising a pair of rods having a cross-sectional shape of a regular polygon and arranged side by side in spaced parallel position, and a further rod of the same cross-sectional shape positioned between said parallel rods with opposed flat sides slidably supported on adjacent flat sides of the parallel rods.

2. Means for slidably supporting a tool or machine part comprising a pair of rods of hexagonal cross-section connected together and arranged side by side in parallel spaced relation, a further rod of the same cross-section extending between said rods and arranged with opposed flat sides in slidable engagement with adjacent flat sides of the parallel rods whereby said rod and said pair of rods are slidable relatively to one another and a tool or machine part mounted on said rod or pair of rods.

3. A slide for a tool or machine part comprising rods having a cross-sectional shape of a regular polygon and arranged side by side in spaced parallel position, and a further rod of the same cross-sectional shape positioned between said parallel rods with opposed flat sides slidably supported on adjacent flat sides of the parallel rods.

4. Means for slidably supporting a tool or machine part comprising rods of hexagonal cross-section connected together and arranged side by side in parallel spaced relation, a further rod of the same cross-section extending between said rods and arranged with opposed flat sides in slidable engagement with adjacent flat sides of the parallel rods whereby said rod and parallel rods are slidable relatively to one another and a tool or machine part mounted on said rod or said parallel rods.

5. A tool or machine part comprising rods of hexagonal shape in cross-section arranged side by side in parallel spaced relation, a reciprocal rod of the same hexagonal cross sectional shape extending parallel to said first mentioned rods with opposed flat faces of said reciprocal rod in slidable engagement with flat faces of the said first mentioned rods, work engaging means mounted on said reciprocal rod, and means for retaining said latter rod in position on said first mentioned rods to permit reciprocal sliding movement over said first mentioned rods.

6. A tool or machine part as claimed in claim 5 wherein the said retaining means comprises a rod of the same hexagonal cross-section having one flat face secured to a flat face of the reciprocal rod, and having other flat faces engaging adjacent flat faces of the said first mentioned rods.

WILLIAM HORACE KENNEDY.

REFERENCES CITED

The following references are of record in the file of this patent:

UNITED STATES PATENTS

| Number | Name | Date |
|---|---|---|
| 1,540,132 | Johannesmeyer | June 2, 1925 |
| 1,849,305 | Magarian | Mar. 15, 1932 |